(12) United States Patent
Arthur et al.

(10) Patent No.: US 10,331,998 B2
(45) Date of Patent: *Jun. 25, 2019

(54) TIME-DIVISION MULTIPLEXED NEUROSYNAPTIC MODULE WITH IMPLICIT MEMORY ADDRESSING FOR IMPLEMENTING A NEURAL NETWORK

(71) Applicant: International Business Machines Corporation, Armonk, NY (US)

(72) Inventors: John V. Arthur, Mountain View, CA (US); Bernard V. Brezzo, Somers, NY (US); Leland Chang, New York, NY (US); Daniel J. Friedman, Sleepy Hollow, NY (US); Paul A. Merolla, Palo Alto, CA (US); Dharmendra S. Modha, San Jose, CA (US); Robert K. Montoye, Rochester, MN (US); Jae-sun Seo, White Plains, NY (US); Jose A. Tierno, Stamford, CT (US)

(73) Assignee: International Business Machines Corporation, Armonk, NY (US)

(*) Notice: Subject to any disclaimer, the term of this patent is extended or adjusted under 35 U.S.C. 154(b) by 104 days.

This patent is subject to a terminal disclaimer.

(21) Appl. No.: 14/963,133

(22) Filed: Dec. 8, 2015

(65) Prior Publication Data

US 2016/0110640 A1    Apr. 21, 2016

Related U.S. Application Data

(63) Continuation of application No. 13/725,476, filed on Dec. 21, 2012, now Pat. No. 9,239,984.

(51) Int. Cl.
*G06N 3/04*  (2006.01)
*G06N 3/063* (2006.01)
*G06N 3/08*  (2006.01)

(52) U.S. Cl.
CPC ............ *G06N 3/049* (2013.01); *G06N 3/063* (2013.01); *G06N 3/08* (2013.01)

(58) Field of Classification Search
CPC .......... G06N 3/08; G06N 3/049; G06N 3/063
See application file for complete search history.

(56) References Cited

U.S. PATENT DOCUMENTS

| 4,994,982 A | 2/1991 | Duranton et al. |
| 7,908,235 B2 | 3/2011 | Snook et al. |
| (Continued) | | |

FOREIGN PATENT DOCUMENTS

EP    0378115 B1    9/1998

OTHER PUBLICATIONS

Ananthanarayanan et al, "Anatomy of a Cortical Simulator", SC07 Nov. 10-16, 2007, Reno, Nevada, USA (c) 2007.*

(Continued)

*Primary Examiner* — Vincent Gonzales
(74) *Attorney, Agent, or Firm* — Sherman IP LLP; Kenneth L. Sherman; Hemavathy Perumal

(57) ABSTRACT

Embodiments of the invention relate to a time-division multiplexed neurosynaptic module with implicit memory addressing for implementing a neural network. One embodiment comprises maintaining neuron attributes for multiple neurons and maintaining incoming firing events for different time steps. For each time step, incoming firing events for said time step are integrated in a time-division multiplexing manner. Incoming firing events are integrated based on the neuron attributes maintained. For each time step, the neuron attributes maintained are updated in parallel based on the integrated incoming firing events for said time step.

15 Claims, 10 Drawing Sheets

(56) References Cited

U.S. PATENT DOCUMENTS

| | | | |
|---|---|---|---|
| 8,126,828 B2 | 2/2012 | Snook et al. | |
| 8,326,782 B2 | 12/2012 | Snook et al. | |
| 8,423,490 B2 | 4/2013 | Deco et al. | |
| 8,510,239 B2 | 8/2013 | Modha | |
| 8,725,662 B2 | 5/2014 | Izhikevich et al. | |
| 8,843,425 B2 | 9/2014 | Modha | |
| 8,856,055 B2 | 10/2014 | Brezzo et al. | |
| 8,909,576 B2 | 12/2014 | Akopyan | |
| 8,918,351 B2 | 12/2014 | Arthur et al. | |
| 8,990,130 B2 | 3/2015 | Alvarez-Icaza Rivera et al. | |
| 2007/0288410 A1 | 12/2007 | Tomkins et al. | |
| 2009/0240642 A1* | 9/2009 | Snook | G06N 3/10 706/27 |
| 2010/0241601 A1 | 9/2010 | Carson et al. | |
| 2010/0257130 A1* | 10/2010 | Smallridge | G06N 3/02 706/25 |
| 2010/0312735 A1 | 12/2010 | Knoblauch | |
| 2011/0051485 A1* | 3/2011 | Chang | G11C 15/00 365/49.17 |
| 2011/0302120 A1* | 12/2011 | Snook | G06F 15/7867 706/33 |
| 2012/0084240 A1 | 4/2012 | Esser et al. | |
| 2012/0109866 A1* | 5/2012 | Modha | G06N 3/063 706/28 |
| 2013/0073491 A1* | 3/2013 | Izhikevich | G06N 3/049 706/15 |
| 2013/0073499 A1* | 3/2013 | Izhikevich | G06N 3/049 706/27 |
| 2014/0180984 A1 | 6/2014 | Arthur et al. | |
| 2016/0260008 A1 | 9/2016 | Arthur | |

OTHER PUBLICATIONS

Ananthanarayanan et al, "The Cat is Out of the Bag: Cortical Simulations with 10⁹ Neurons, 10¹³ Synapses", SC09 Nov. 14-20, 2009, Portland, Oregon, USA.*

Brette et al, "Simulation of networks of spiking neurons: A review of tools and strategies", J Comput Neurosci (2007) 23:349-398 / Revised Apr. 2, 2007 / Accepted: Apr. 12, 2007 / Published online: Jul. 12, 2007, Springer Science + Business Media, LLC 2007.*

Choi et al, "Neuromorphic Implementation of Orientation Hypercolumns", IEEE Transactions on Circuits and Systems—I: Regular Papers, vol. 52, No. 6, Jun. 2005.*

Glackin et al, "A Novel Approach for the Implementation of Large Scale Spiking Neural Networks on FPGA Hardware", IWANN 2005, LNCS 3512, pp. 552-563, 2005, Springer-Verlag Berlin Heidelberg 2005.*

Harkin et al, "Reconfigurable Platforms and the Challenges for Large-Scale Implementations of Spiking Neural Networks", Published in: International Conference on Field Programmable Logic and Applications, 2008. FPL 2008, Date of Conference: Sep. 8-10, 2008 pp. 483-486.*

Harkin et al, "A Reconfigurable and Biologically Inspired Paradigm for Computation Using Network-On-Chip and Spiking Neural Networks", Hindawi Publishing Corporation International Journal of Reconfigurable Computing vol. 2009, Article ID 908740, 13 pages, Jan. 2009.*

Jin et al, "Modeling Spiking Neural Networks on SpiNNaker", Sep./Oct. 2010, 97.*

Lin et al, "Programmable Connections in Neuromorphic Grids", Published in: Midwest Symposium on Circuits and Systems, 2006. MWSCAS '06. 49th IEEE International (vol. 1 ), Date of Conference: Aug. 6-9, 2006, pp. 80-84.*

Marian et al, "Efficient event-driven simulation of spiking neural networks", Proceedings 01 3rd WSES, International Conference on Neural Networks and Applications. Interlaken, Switzerland, Feb. 2002.*

Merolla et al, "Expandable Networks for Neuromorphic Chips", IEEE Transactions on Circuits and Systems—I: Regular Papers, vol. 54, No. 2, Feb. 2007.*

Merolla et al, "A recurrent model of orientation maps with simple and complex cells", University of Pennsylvania, Dec. 9, 2003.*

Nageswaran et al, "Efficient Simulation of Large-Scale Spiking Neural Networks Using CUDA Graphics Processors", Proceedings of International Joint Conference on Neural Networks, Atlanta, Georgia, USA, Jun. 14-19, 2009.*

Rivas-Perez et al, "Visual Spike-based convolution processing with a cellular automata architecture", The 2010 Intenational Joint Conference on Neural Network (IJCNN), Date of Conference: Jul. 18-23, 2010, pp. 1-7.*

Rossello et al, "Spiking Neural Network Self-configuration for Temporal Pattern Recognition Analysis", ICANN 2009, Part I, LNCS 5768, pp. 421-428, 2009, Springer-Verlag Berlin Heidelberg 2009.*

Seo et al, "A 45nm CMOS Neuromorphic Chip with a Scalable Architecture for Learning in Networks of Spiking Neurons", Published in: Custom Integrated Circuits Conference (CICC), 2011 IEEE, Date of Conference: Sep. 19-21, 2011, pp. 1-4*

Vogelstein et al, "Dynamically Reconfigurable Silicon Array of Spiking Neurons With Conductance-Based Synapses", IEEE Transactions on Neural Networks, vol. 18, No. 1, Jan. 2007.*

Bamford, S.A., et al., "Large Developing Axonal Arbors Using a Distributed and Locally-Reprogrammable Address-Event Receiver", Proceedings of the 2008 International Joint Conference on Neural Networks (IJCNN 2008), Jun. 1-8, 2008, IEEE World Congress on Computational Intelligence, pp. 1-8, IEEE, United States.

Joshi, S. et al., "Scalable Event Routing in Hierarchical Neural Array Architecture with Global Synaptic Connectivity", Proceedings of the 2010 12th International Workshop on Cellular Nanoscale Networks and their Applications (CNNA), Feb. 3-5, 2010, pp. 1-6, IEEE, United States.

Bamford, S.A., "Synaptic Rewiring in Neuromorphic VLSI for Topographic Map Formation", Doctor of Philosophy, 2009, pp. 1-251, Institute for Adaptive and Neural Computation, University of Endinburgh, Scotland.

Vogelstein, R.J. et al., "Dynamically Reconfigurable Silicon Array of Spiking Neurons With Conductance-Based Synapses", Proceedings of the IEEE Transactions on Neural Networks, Jan. 2007, pp. 253-265, vol. 18, No. 1, United States.

Arthur, J.V., "Learning in Silicon: A Neuromorphic Model of the Hippocampus", Presented to the Faculties of the University of Pennsylvania in Partial Fulfillment of the Requirements for the Degree of Doctor Philosophy, 2006, pp. 1-246, United States.

Merolla, P. et al., "A recurrent model of orientation maps with simple and complex cells", Department of Bioengineering, Dec. 9, 2003, pp. 1-10, University of Pennsylvania, United States.

Brette, R. et al., "Simulation of networks of spiking neurons: A review of tools and strategies", J Comput Neurosci, 2007, pp. 349-398, Springer Science, United States.

Marian, I. et al., "Efficient even-driven simulation of spiking neural networks", Proceedings of 3rd International Conference on Neural Networks and Applications, Feb. 2002, pp. 1-9, Interlaken, Switzerland.

Nageswaran, J.M. et al., "Efficient Simulation of Large-Scale Spiking Neural Networks Using CUDA Graphics Processors", Proceedings of the International Joint Conference on Neural Networks, Jun. 14-19, 2009, p. 1-8, IEEE, United States.

Choi, T. et al., "Neuromorphic Implementation of Orientation Hypercolumns", Proceedings of the IEEE Transactions on Circuits and Systems, Jun. 2005, pp. 1049-1060, vol. 52, No. 6, United States.

Merolla, P.A. et al., "Expandable Networks for Neuromorphic Chips," IEEE Transactions on Circuits and Systems—I: Regular Papers, Feb. 2007, pp. 301-311, vol. 54, No. 2, IEEE, United States.

Rossello, J.L. et al., "Spiking Neural Network Self-configuration for Temporal Pattern Recognition Analysis", LNCS 5768, ICANN 2009, pp. 421-428, Springer-Verlag, Berlin Heidelberg.

Seo, J. et al., "A 45nm CMOS Neuromorphic Chip with a Scalable Architecture for Learning in Networks of Spiking Neurons", Proceedings of the 2011 IEEE Custom Integrated Circuits Conference (CICC), Sep. 19-21, 2011, pp. 1-4, IEEE, United States.

(56) References Cited

OTHER PUBLICATIONS

Ananthanarayanan, R. et al., "Anatomy of a Cortical Simulator," Proceedings of the 2007 ACM/IEEE Conference on Supercomputing (SC '07), 2007, 12 pages, ACM, United States.

Harkin, J. et al., "A Reconfigurable and Biologically Inspired Paradigm for Computation Using Network-On-Chip and Spiking Neural Networks", International Journal of Reconfigurable Computing, 2009, pp. 1-14, United States.

Ananthanarayanan, R. et al., "The Cat is Out of the Bag: Cortical Simulations with 109 Neurons, 1013 Synapses", Proceedings of the Conference on High Performance Computing Networking, Storage and Analysis SC'09, Nov. 14-20, 2009, pp. 1-12, No. 63, ACM, United States.

Glackin, B. et al., "A Novel Approach for the Implementation of Large Scale Spiking Neural Networks on FPGA Hardware", Proceedings of the 8th International Conference on Artificial Neural Networks: Computational Intelligence and Bioinspired Systems (IWANN '05), Jun. 2005, pp. 552-563, Springer-Verlag Berlin, Heidelberg, Germany.

Lin, J. et al., "Programmable Connections in Neuromorphic Grids", Proceedings of the 49th International Midwest Symposium on Circuits and Systems, Aug. 6-9, 2006, pp. 80-84, IEEE, United States.

Jin, X. et al., "Modeling Spiking Neural Networks on SpiNNaker", Computing in Science & Engineering, Sep.-Oct. 2010, pp. 91-97, IEEE, United States.

Harkin, J. et al., "Reconfigurable Platforms and the Challenges for Large-Scale Implementations of Spiking Neural Networks", Proceedings of the International Conference on Field Programmable Logic and Applications (FPL 2008), Sep. 8-10, 2008, pp. 483-486, IEEE, United States.

Rivas-Perez, M. et al., "Visual Spike Processing based on Cellular Automaton", Cellular Automata—Simplicity Behind Complexity, Apr. 11, 2011, pp, 529-547, United States.

Rivas-Perez, M. et al., "Visual Spiked-based Convolution Processing with a Cellular Automata Architecture", Proceedings of the 2010 International Joint Conference on Neural Networks (IJCNN), Jul. 18-23, 2010, pp. 1-7, IEEE, United States.

U.S. Non-Final Office Action for U.S. Appl. No. 13/725,463 dated Jan. 7, 2015.

U.S. Non-Final Office Action for U.S. Appl. No. 13/725,463 dated Jun. 16, 2015.

U.S. Final Office Action for U.S. Appl. No. 13/725,463 dated Dec. 3, 2015.

U.S. Non-Final Office Action for U.S. Appl. No. 13/725,476 dated Jan. 6, 2015.

U.S. Final Office Action for U.S. Appl. No. 13/725,476 dated Mar. 26, 2015.

U.S. Advisory Action for U.S. Appl. No. 13/725,476 dated May 12, 2015.

U.S. Non-Final Office Action for U.S. Appl. No. 13/725,476 dated Jul. 13, 2015.

U.S. Notice of Allowance for U.S. Appl. No. 13/725,476 dated Sep. 9, 2015.

U.S. Notice of Allowance for U.S. Appl. No. 13/725,463 dated Feb. 25, 2016.

U.S. Non-Final Office Action for U.S. Appl. No. 15/154,169 dated Sep. 16, 2016.

Mirhassani, M. et al., "A feed-forward time-multiplexed neural network with mixed-signal neuron-synapse arrays", Journal of Microelectronic engineering, Feb. 2007, pp. 300-307, vol. 84, No. 2, Elsevier, Ontario, Canada (available online on Mar. 20, 2006).

U.S. Final Office Action for U.S. Appl. No. 15/154,169 dated May 3, 2017.

U.S. Notice of Allowance for U.S. Appl. No. 15/154,169 dated Jul. 7, 2017.

* cited by examiner

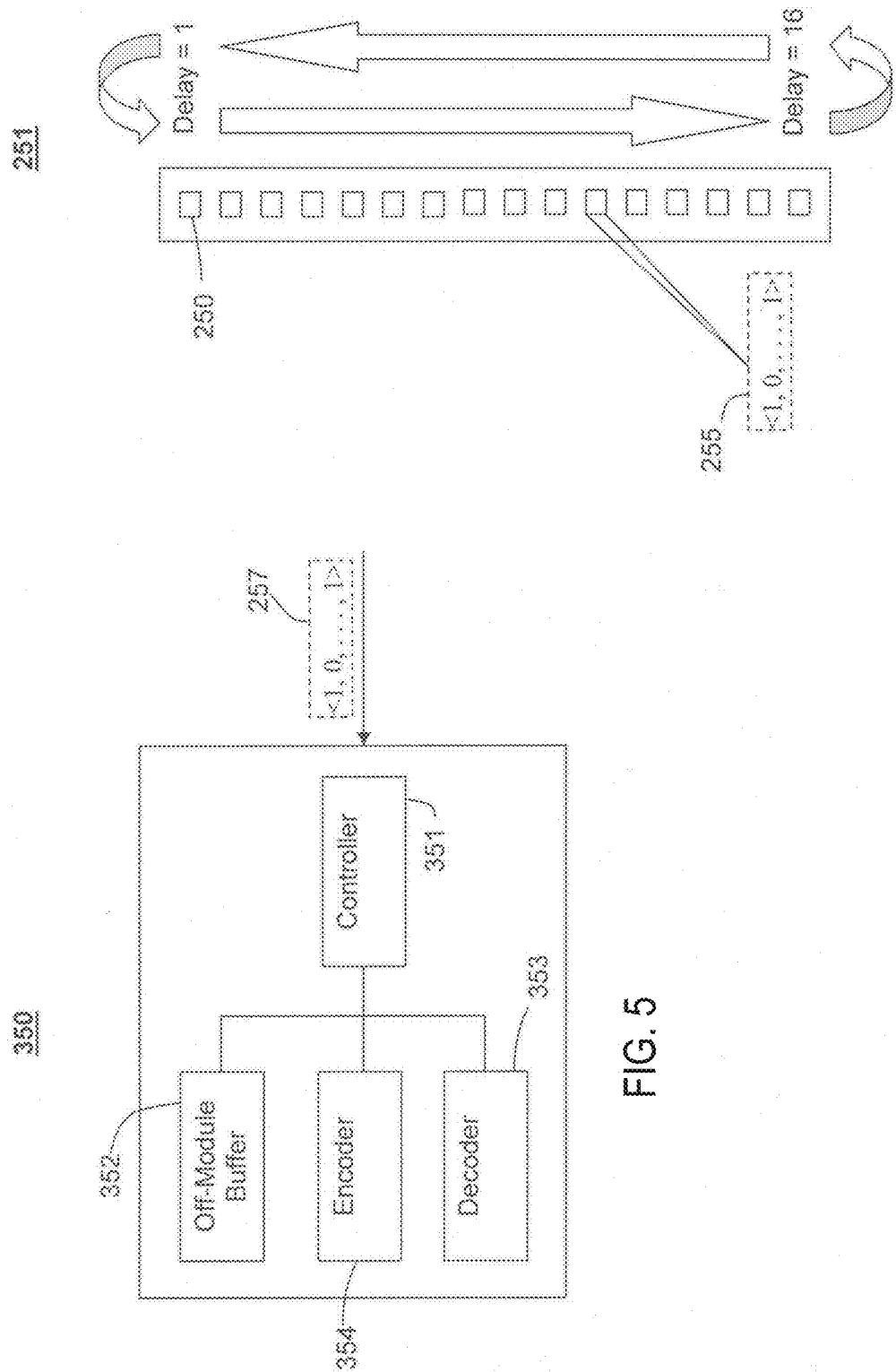

TIME-DIVISION MULTIPLEXED NEUROSYNAPTIC MODULE WITH IMPLICIT MEMORY ADDRESSING FOR IMPLEMENTING A NEURAL NETWORK

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, a time-division multiplexed neurosynaptic module with implicit memory addressing for implementing a neural network.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention relate to a time-division multiplexed neurosynaptic module with implicit memory addressing for implementing a neural network. One embodiment comprises maintaining neuron attributes for multiple neurons, and maintaining incoming firing events for different time steps. For each time step, incoming firing events for said time step are integrated in a time-division multiplexing manner. Incoming firing events are integrated based on the neuron attributes maintained. For each time step, the neuron attributes maintained are updated in parallel based on the integrated incoming firing events for said time step.

Another embodiment comprises a neurosynaptic device including a memory device that maintains neuron attributes for multiple neurons, and a scheduler that manages incoming firing events for different time steps. A multi-way processor integrates incoming firing events for each time step in a time-division multiplexing manner, and updates the neuron attributes maintained for said multiple neurons. The incoming firing events are integrated based on the neuron attributes maintained.

These and other features, aspects and advantages of the present invention will become understood with reference to the following description, appended claims and accompanying figures.

BRIEF DESCRIPTION OF THE SEVERAL VIEWS OF THE DRAWINGS

FIG. 5 illustrates a block diagram of a scheduler device, in accordance with an embodiment of the invention;

FIG. 6 illustrates a collection of axon activity bit maps, in accordance with an embodiment of the invention;

DETAILED DESCRIPTION

Embodiments of the invention relate to a time-division multiplexed neurosynaptic module with implicit memory addressing for implementing a neural network. One embodiment comprises maintaining neuron attributes for multiple neurons, and maintaining incoming firing events for different time steps. For each time step, incoming firing events for said time step are integrated in a time-division multiplexing manner. Incoming firing events are integrated based on the neuron attributes maintained. For each time step, the neuron attributes maintained are updated in parallel based on the integrated incoming firing events for said time step.

Another embodiment comprises a neurosynaptic device including a memory device that maintains neuron attributes for multiple neurons, and a scheduler that manages incoming firing events for different time steps. A multi-way processor integrates incoming firing events for each time step in a time-division multiplexing manner, and updates the neuron attributes maintained for said multiple neurons. The incoming firing events are integrated based on the neuron attributes maintained.

The term digital neuron as used herein represents an framework configured to simulate a biological neuron. An digital neuron creates connections between processing elements that are roughly functionally equivalent to neurons of a biological brain. As such, a neuromorphic and synaptronic computation comprising digital neurons according to embodiments of the invention may include various electronic circuits that are modeled on biological neurons. Further, a neuromorphic and synaptronic computation comprising digital neurons according to embodiments of the invention may include various processing elements (including computer simulations) that are modeled on biological neurons. Although certain illustrative embodiments of the invention are described herein using digital neurons comprising digital circuits, the present invention is not limited to digital circuits. A neuromorphic and synaptronic computation according to embodiments of the invention can be implemented as a neuromorphic and synaptronic framework comprising circuitry, and additionally as a computer simulation. Indeed, embodiments of the invention can take the form of an entirely hardware embodiment, an entirely software embodiment or an embodiment containing both hardware and software elements.

Figure 1A:
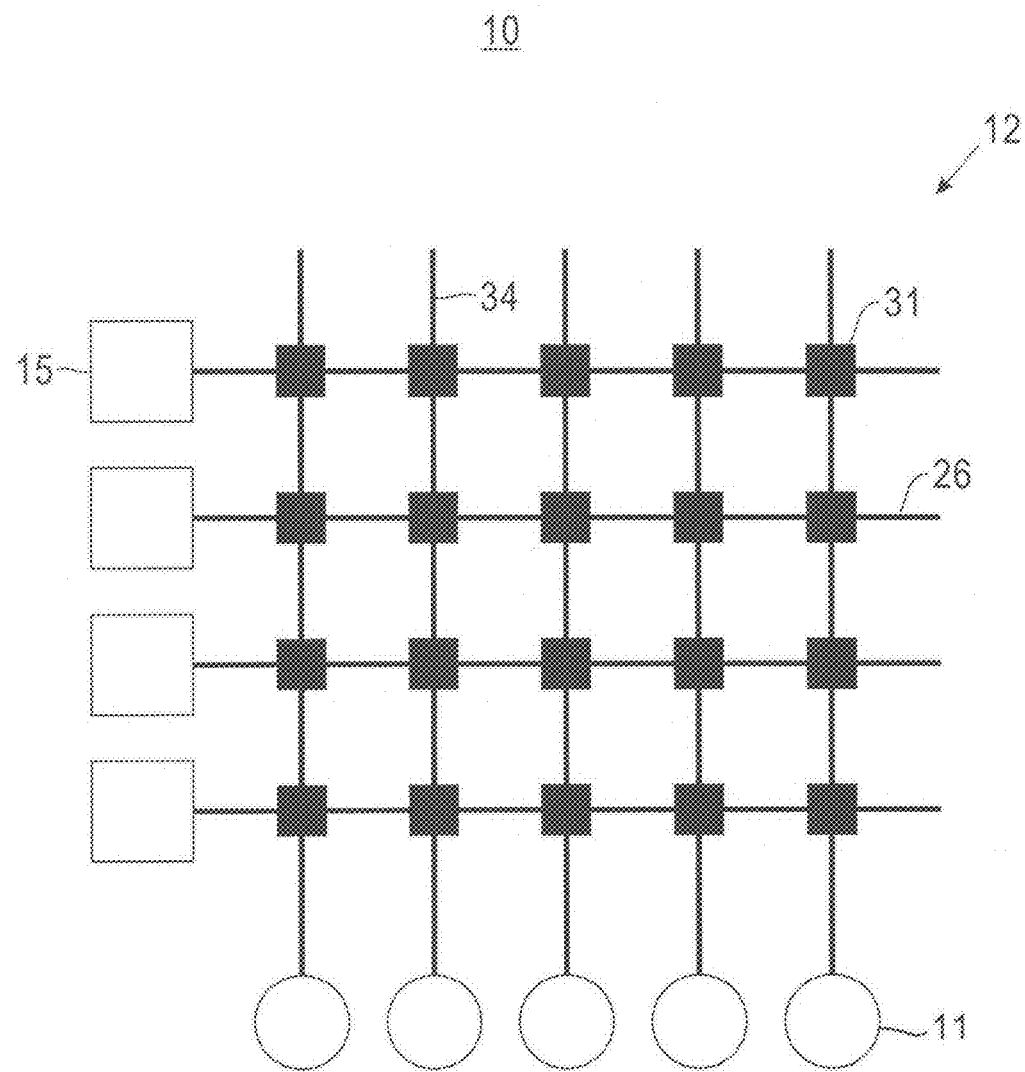
FIG. 1A illustrates a neurosynaptic core circuit, in accordance with an embodiment of the invention.

FIG. 1A illustrates a neurosynaptic core circuit 10, in accordance with an embodiment of the invention. The core circuit 10 is a neural core circuit. The core circuit 10 comprises multiple incoming axons 15 and multiple neurons 11. Each neuron 11 and each axon 15 has configurable operational parameters. The core circuit 10 further comprises a synaptic crossbar 12 including multiple synapses 31, multiple rows/axon paths 26, and multiple columns/dendrite paths 34.

Each synapse 31 communicates firing events (e.g., spike events) between an axon 15 and a neuron 11. Specifically, each synapse 31 is located at cross-point junction between an axon path 26 and a dendrite path 34, such that a connection between the axon path 26 and the dendrite path 34 is made through said synapse 31. Each axon 15 is connected to an axon path 26, such that said axon 15 sends spikes to the connected axon path 26. Each neuron 11 is connected to a dendrite path 34, such that said neuron 11 receives spikes from the connected dendrite path 34.

Each synapse 31 has a synaptic weight. The synaptic weights of the synapses 31 of the core circuit 10 may be represented by a weight matrix W, wherein an element $W_{ij}$ of the matrix W represents a synaptic weight of a synapse 31 located at a row/axon path i and a column/dendrite path j of the crossbar 12. In one embodiment, the synapses 31 are binary memory devices. Each synapse 31 can have a weight "0" indicating that said synapse 31 is non-conducting, or a weight "1" indicating that said synapse 31 is conducting. A learning rule such as spike-timing dependent plasticity (STDP) may be applied to update the synaptic weights of the synapses 31.

Figure 1B:
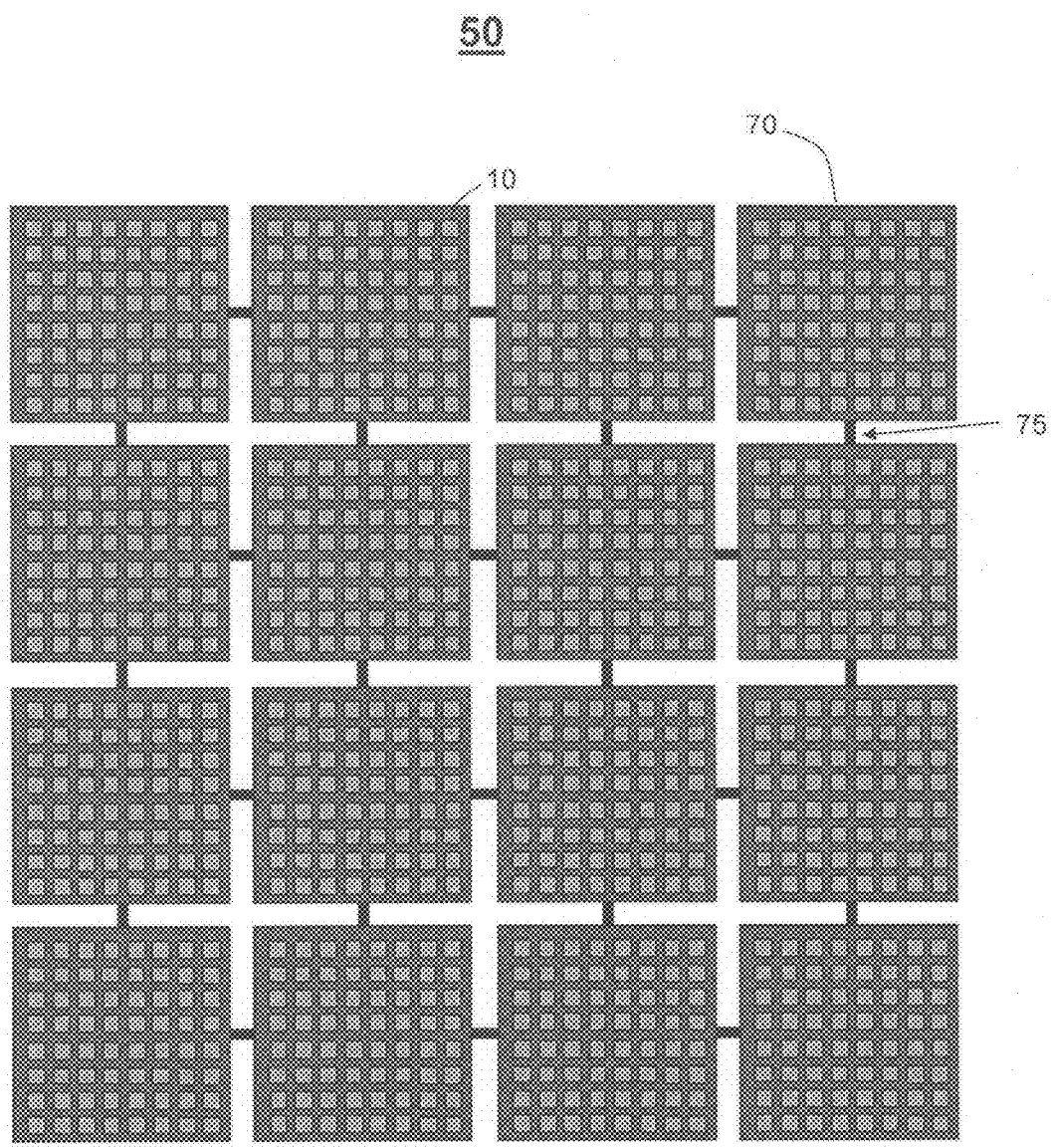
FIG. 1B illustrates an example neural network, in accordance with an embodiment of the invention.

FIG. 1B illustrates an example neural network 50, in accordance with an embodiment of the invention. The neural network 50 is a scalable neuromorphic and synaptronic architecture. The neural network 50 includes multiple chip structures 70. Each chip structure 70 comprises multiple core circuits 10. An event routing system 75 of the neural network 50 routes firings events between core circuits 10 of the chip structures 70. A core circuit 10 of the neural network 50 may send firing events to, and receive firing events from, a different core circuit 10 of the same chip structure 70 or a different chip structure 70.

In one embodiment, the routing system 75 comprises point-to-point connections. In another embodiment, the routing system 75 comprises network-on-chip channels and inter-chip routers.

In one embodiment, a neural network including at least one core circuit 10 may be implemented as a time-division multiplexed neurosynaptic module. A neurosynaptic module is an electronic device comprising at least one multi-way parallel processor.

Figure 2:
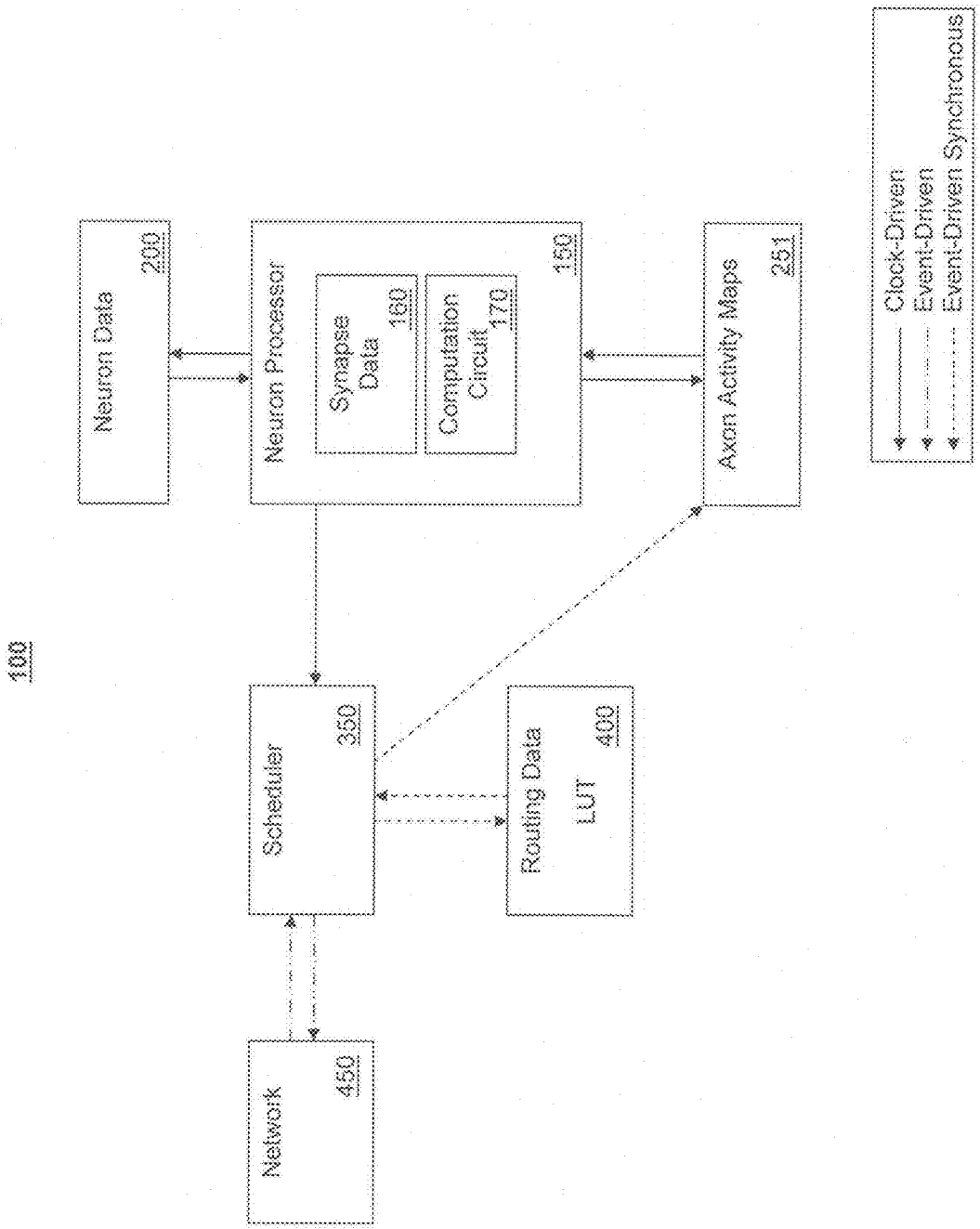
FIG. 2 is a block diagram of a time-division multiplexed neurosynaptic module, in accordance with an embodiment of the invention.

FIG. 2 is a block diagram of a time-division multiplexed neurosynaptic module 100, in accordance with an embodiment of the invention. The neurosynaptic module 100 comprises at least one multi-way parallel processor device ("processor") 150. Each processor 150 multiplexes computation and control logic for a plurality of neurons 11. In one embodiment, each processor 150 multiplexes computation and control logic for neurons 11 of one core circuit 10. In another embodiment, each processor 150 multiplexes computation and control logic for neurons 11 of different core circuits 10.

The processors 150 of the neurosynaptic module 100 run in parallel. Each processor 150 has a corresponding neuron data memory device 200, a corresponding collection 251 of axon activity bit maps 250, a corresponding scheduler device ("scheduler") 350, and a corresponding routing data lookup table (LUT) 400. A neuron data memory device 200 maintains neuron attributes 215 for multiple neurons 11. In one embodiment, the memory device 200 maintains neuron attributes 215 for neurons 11 of one core circuit 10. In another embodiment, the memory device 200 maintains neuron attributes 215 for neurons 11 of different core circuits 10. A routing data LUT 400 maintains routing information for multiple neurons 11. A collection 251 of axon activity bit maps 250 maintains incoming firing events that are delivered to target incoming axons 15 in future time steps. Each bit of a bit map 250 corresponds to an incoming axon 15.

The neurosynaptic module 100 is connected to an interconnect network 450 that communicates firing events between multiple neurosynaptic modules 100. In one embodiment, firing events are propagated through the interconnect network 450 in the form of address-event packets. Each address-event packet includes a firing event encoded as a binary address that represents a target incoming axon 15, a time stamp indicating when the firing event was generated, and a predetermined delivery delay indicating when the firing event should be delivered to the target incoming axon 15. The scheduler 350 receives address-events from, and sends address-event packets to, the interconnect network 450.

Each processor 150 comprises a synapse data memory array 160 and a computation logic circuit ("computation circuit") 170. A memory array 160 maintains synaptic connectivity information for multiple neurons 11. In one embodiment, a memory array 160 is a transposable memory array including configurable synaptic connectivity information. In another embodiment, a memory array 160 is a non-transposable memory array including static synaptic connectivity information. A computation circuit 170 integrates incoming firing events for a current time step, and updates neuron attributes 215 based on the firing events integrated.

A processor 150 that multiplexes computation and control logic for n neurons 11 is an n-way processor 150, wherein n is an integer value. The computation circuit 170 of an n-way processor 150 is time-multiplexed n times.

The total number of neurons 11 represented by the neurosynaptic module 100 is equal to the product of the number of processors 150 contained within the neurosynaptic module 100, and the number of times each processor 150 of the neurosynaptic module 100 is time-multiplexed. For example, if the neurosynaptic module 100 contains Y processors 150 and each processor 150 is time-multiplexed n times, the total number of neurons 11 represented by the neurosynaptic module 100 is Y×n, where Y and n are positive integer values.

The optimal number of neurons 11 that a neurosynaptic module 100 may represent is dependent on several factors, including the connectivity of the neurons 11, communication power overhead, and the performance of the synapse data memory array 160 of each processor 150.

Figures 3A, 3B:
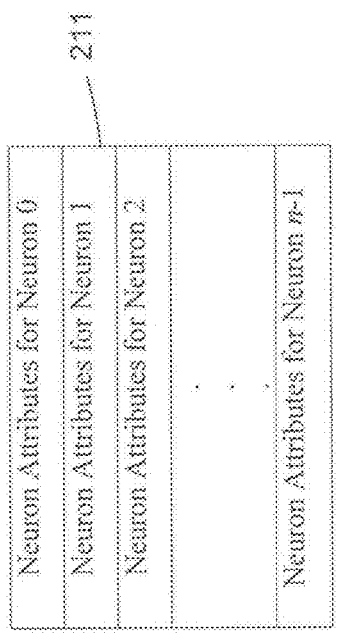
FIG. 3A illustrates a neuron data memory device, in accordance with an embodiment of the invention.
FIG. 3B illustrates example neuron attributes maintained in an entry of a neuron data memory device, in accordance with an embodiment of the invention.

FIG. 3A illustrates a neuron data memory device 200, in accordance with an embodiment of the invention. As stated above, each processor 150 has a corresponding neuron data memory device 200 that maintains neuron attributes 215 for multiple neurons 11. The memory device 200 comprises multiple entries 211. Each entry 211 maintains neuron attributes 215 for a corresponding neuron 11.

As shown in FIG. 3A, the memory device 200 maintains neuron attributes 215 for neurons Neuron 0, Neuron 1, . . . , and Neuron n−1, wherein n represents the number of neurons 11 that the memory device 200 maintains information for.

FIG. 3B illustrates example neuron attributes 215 maintained in an entry 211 of a neuron data memory device 200, in accordance with an embodiment of the invention. In one embodiment, each entry 211 maintains the following neuron attributes 215 for a corresponding neuron 11: a membrane potential variable (V), a threshold parameter (Th), a leak rate parameter (Lk), and synaptic excitation/inhibition strengths for each possible axon type (Syn0, Syn1, Syn2, etc.).

Figure 4A:
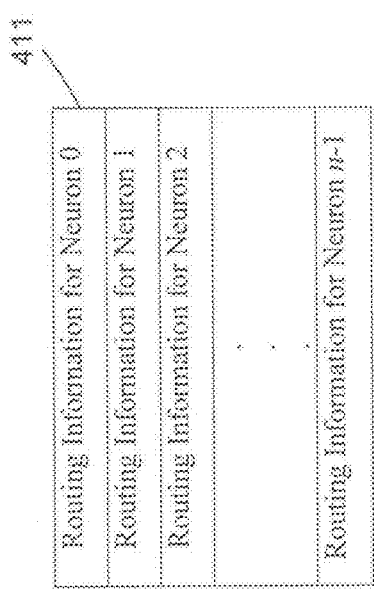
FIG. 4A illustrates a routing data lookup table, in accordance with an embodiment of the invention.

FIG. 4A illustrates a routing data lookup table 400, in accordance with an embodiment of the invention. As stated above, each processor 150 has a corresponding routing data LUT 400 that maintains routing information for multiple neurons 11. The LUT 400 comprises multiple entries 411. Each entry 411 maintains routing information for a corresponding neuron 11.

As shown in FIG. 4A, the LUT 400 maintains routing information for neurons Neuron 0, Neuron 1, . . . , and Neuron n−1, wherein n represents the number of neurons 11 that the LUT 400 maintains information for.

Figure 4B:
FIG. 4B illustrates example routing information maintained in an entry of a routing data lookup table, in accordance with an embodiment of the invention.

FIG. 4B illustrates example routing information maintained in an entry 411 of a routing data lookup table 400, in accordance with an embodiment of the invention. In one embodiment, each entry 411 maintains the following routing information for a corresponding neuron 11: fanout (F), and delivery delay (ΔT). The fanout of a neuron 11 indicates a target incoming axon 15 that the neuron 11 sends outgoing firing events to. The delivery delay of a neuron 11 indicates when an outgoing firing event generated by the neuron 11 should be delivered to a target incoming axon 15 for processing.

FIG. 5 illustrates a block diagram of a scheduler device 350, in accordance with an embodiment of the invention. As stated above, each processor 150 has a corresponding scheduler device 350. The scheduler 350 comprises a controller 351, an off-module buffer ("buffer") 352, a decoder unit ("decoder") 353, and an encoder unit ("encoder") 354.

The controller 351 generates time steps that triggers when a corresponding processor 150 integrates incoming firing events.

The decoder 353 receives from the interconnect network 450 (i.e., off-module) incoming address events packets that include firing events generated by other neurosynaptic modules 100. The decoder 353 decodes each incoming address event packet received. In one embodiment, decoded incoming firing events are temporarily held in the buffer 352 before the controller 351 copies the firing events to an axon activity bit map 250. The buffer 352 is cleared after the controller 351 has copied the decoded incoming firing events to a bit map 250.

The controller 351 generates axon vectors 255. Each axon vector 255 corresponds to a time step (i.e., a current time step or a future time step). Each axon vector 255 represents axon activity for incoming axons 15 in a corresponding time step. Each index of an axon vector 255 corresponds to an incoming axon 15. In one embodiment, each index with a bit value of "1" indicates that a corresponding axon 15 received a firing event. Each index with a bit value of "0" indicates that a corresponding axon 15 did not receive a firing event. In one embodiment, each axon vector 255 represents axon activity for incoming axons 15 of a corresponding core circuit 10 in a corresponding time step.

The controller 351 writes each axon vector 255 generated to an axon activity bit map 250 of the collection 251, wherein the bit map 250 corresponds to the same time step that said axon vector 255 corresponds to.

In one embodiment, for each incoming firing event, the controller 351 computes the difference d between the arrival time of said firing event at the scheduler 350 and the time stamp indicating when said firing event was generated. If the difference d is less than a predetermined delivery delay x, the firing event is maintained in a bit map 250 for a delay period D equal to the difference between x and d to achieve x time steps from firing event generation to firing event delivery. The processor 150 reads the firing event from the bit map 250 at the end of the delay period.

For example, if the delivery delay for a firing event is 9 time steps and the firing event arrives at the scheduler 350 within 3 time steps from generation, the scheduler 350 delays the delivery of the firing event by 6 time steps, such that the processor 150 reads the firing event from a bit map 250 only at the end of 9 time steps from generation.

In each time step, the scheduler 350 receives an update vector 257 from a corresponding processor 150, wherein the update vector 257 represents firing activity of multiple neurons 11 during said time step. Each index of an update vector 257 corresponds to a neuron 11. Each index with a bit value of "1" indicates that a corresponding neuron 11 generated an outgoing firing event. Each index with a bit value of "0" indicates that a corresponding neuron 11 did not generate an outgoing firing event.

Each outgoing firing event targets either an incoming axon 15 of the same neurosynaptic module 100 (i.e., on-module) or a different neurosynaptic module 100 (i.e., off-module). For each index of an update vector 257 with a bit value of "1", the controller 351 looks up routing information for a corresponding neuron 11 in the LUT 400. If the target axon 15 for an outgoing firing event is on-module (i.e., on the same neurosynaptic module 100), the controller 351 determines, based on the current time step and the delivery delay of the firing event, which bit map 250 of the collection 251 to update, and updates a bit of the determined bit map 250 accordingly. If the target axon 15 for an outgoing firing event is off-module (i.e., on a different neurosynaptic module 100), the encoder 354 encapsulates the outgoing firing event as an outgoing address event packet, and sends the outgoing address event packet to the interconnect network 450.

FIG. 6 illustrates a collection 251 of axon activity bit maps 250, in accordance with an embodiment of the invention. As stated above, each processor 150 has a corresponding collection 251 of axon activity bit maps 250. Each bit map 250 maintains at least one axon vector 255.

Each bit map 250 of the collection 251 corresponds to a future time step. Specifically, each bit map 250 corresponds to a duration of delay. For example, as shown in FIG. 6, the collection 251 maintains bit maps 250 corresponding to delays ranging from one time step to sixteen time steps from the current time step t. A first bit map 250 corresponds to axon activity that will occur after a delay of one time step, a second bit map 250 corresponds to axon activity after a delay of two time steps, . . . , and a sixteenth bit map 250 corresponds to axon activity after a delay of sixteen time steps. Each bit map 250 maintains one or more axon vectors 255, wherein each axon vector 255 indicates the axon activity of incoming axons 15 in a time step equal to the current time step t plus a corresponding delay of said bit map 250.

A corresponding processor 150 iterates through each bit map 255 of the collection 251. Specifically, the processor 105 reads an axon vector 255 from a bit map 250 only when a delay corresponding to said bit map 250 has elapsed. For example, in time step t+1, the processor 150 reads axon vectors 255 from the first bit map 250 corresponding to time step t+1. In time step t+16, the processor 150 reads axon vectors 255 from the sixteenth bit map 250 corresponding to time step t+16.

Each axon vector 255 is reset after said axon vector 255 has been read by the corresponding processor 150. After each axon vector 255 of the sixteenth bit map 250 has been read, the processor 150 begins another iteration through each bit map 250 of the collection 251. For example, in time step t+17, the processor 150 reads axon vectors from the first bit map 250.

Figure 7A:
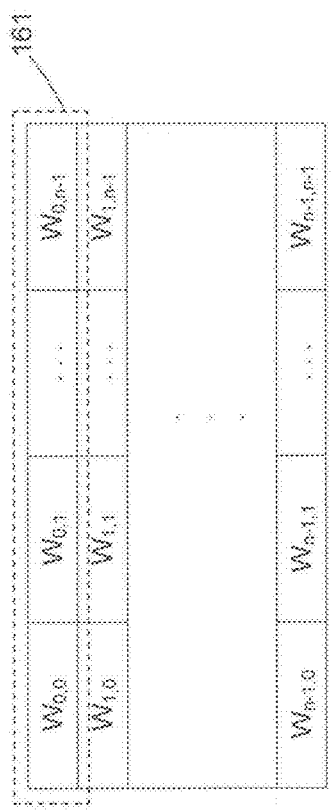
FIG. 7A illustrates a non-transposable synapse data memory array, in accordance with an embodiment of the invention.

FIG. 7A illustrates a non-transposable synapse data memory array 160, in accordance with an embodiment of the invention. As stated above, each processor 150 has a synapse data memory array 160. In one embodiment, the memory array 160 is a non-transposable memory array that maintains static synaptic connectivity information for multiple neurons 11.

The memory array 160 comprises multiple entries 161. Each entry 161 maintains synaptic weights for a corresponding neuron 11. As shown in FIG. 7A, a first entry 161 includes synaptic weights $W_{0,0}$, $W_{0,1}$, . . . , and $W_{0,n-1}$.

Figure 7B:
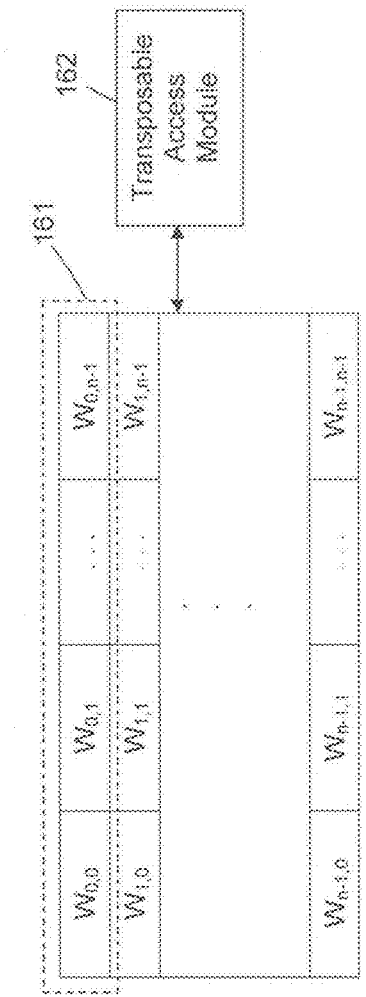
FIG. 7B illustrates a transposable synapse data memory array, in accordance with an embodiment of the invention.

FIG. 7B illustrates a transposable synapse data memory array 160, in accordance with an embodiment of the invention. In another embodiment, the memory array 160 of a processor 150 is a transposable memory array maintaining configurable synaptic connectivity information for multiple neurons 11. The memory array 160 has a corresponding transposable access module 162 that facilitates transposable access to the memory array 160. Synaptic weights may be read from, and written to, the memory array 160, in both horizontal and vertical directions for enhanced learning operation. The synaptic weights maintained may be updated based on a learning rule, and/or the firing activity of a corresponding neuron 11.

The memory array 160 comprises multiple entries 161. Each entry 161 maintains synaptic weights for a corresponding neuron 11. As shown in FIG. 7A, a first entry 161 includes synaptic weights $W_{0,0}$, $W_{0,1}$, . . . , and $W_{0,n-1}$.

Figure 8:
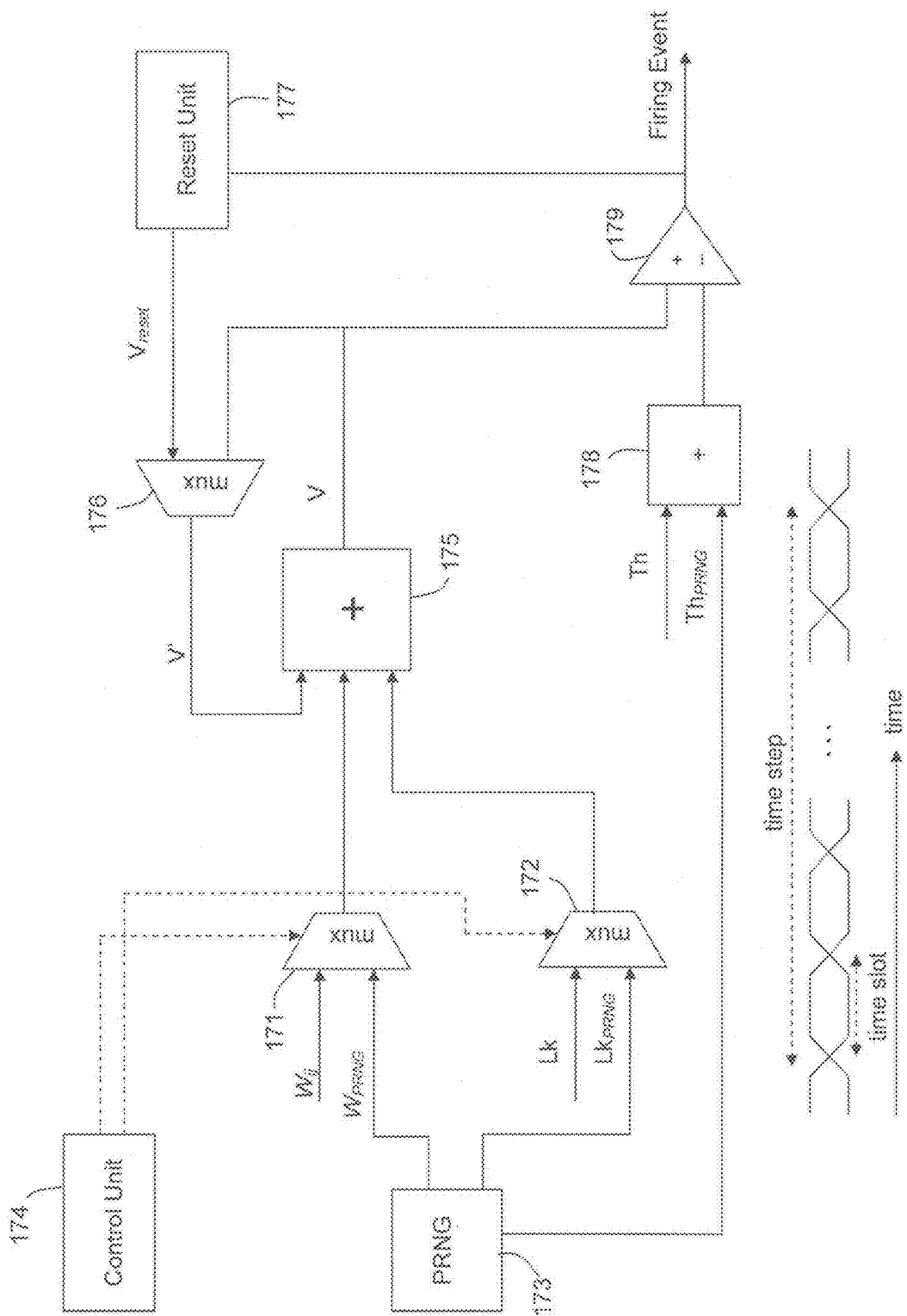
FIG. 8 illustrates an example computation circuit of a multi-way parallel processor device, in accordance with an embodiment of the invention.

FIG. 8 illustrates an example computation circuit 170 of a multi-way parallel processor device 150, in accordance with an embodiment of the invention. As stated above, each processor 150 has a computation circuit 170. In one embodiment, the circuit 170 comprises a first multiplexer 171, a second multiplexer 172, a pseudo-random number generator (PRNG) 173, a time-division multiplexing control unit 174, a first adder unit ("first adder") 175, a third multiplexer 176, a reset unit 177, a second adder unit ("second adder") 178, and a comparator unit ("comparator") 179.

To implement an n-way processor 150, the computation circuit 170 is time-multiplexed n times, wherein n represents the number of neurons 11 that the processor multiplexes computation and control logic for. The control unit 174 divides each time step into n time slots. In each time slot, incoming firing events targeting a corresponding incoming axon are integrated. The control unit 174 is further configured to send control signals to components of the circuit 170.

The PRNG 173 generates random numbers for use in stochastic operations. For example, the PRNG 173 may be used to generate a random synaptic weight $W_{PRNG}$, a random leak rate $Lk_{PRNG}$, and a random threshold $Th_{PRNG}$.

At the beginning of each time step, the processor 150 reads an axon vector 255 from a bit map 250 corresponding to said time step. The axon vector 255 is reset after it is read by the processor 150. The processor 150 is loaded with neuron attributes for all neurons 11 that a corresponding memory device 200 maintains information for. In one example implementation, the neuron attributes are loaded into local registers (e.g., latches or flip-flops) of the processor 150.

The processor 150 iterates through each index of the axon vector 250. For each index i of the axon vector 255 read with a bit value of "1", each synaptic weight maintained in the $i^{th}$ entry of the memory array 160 is read. For each synaptic weight $W_{ij}$ that is read from the $i^{th}$ entry of the memory array 160, the first multiplexer 171 selects between the synaptic weight $W_{ij}$ and a random synaptic weight $W_{PRNG}$.

For the first addition that corresponds to the first index of the axon vector 255 with a bit value of "1", the first adder 175 increments the membrane potential variable V (loaded from the $i^{th}$ entry of the corresponding memory device 200) by the value selected by the first multiplexer 171. For subsequent additions (i.e., the remaining indices of the axon vector 255 with a bit value of "1"), the first adder 175 increments a modified membrane potential variable V' by the value selected by the first multiplexer 171. The modified membrane potential variable V' is a temporary variable provided by the third multiplexer 176. The third multiplexer 176 selects between an updated membrane potential variable V provided by the first adder 175 and a reset membrane potential variable $V_{reset}$ generated by the reset unit 177.

The second multiplexer 172 selects between a leak rate parameter Lk (loaded from the $i^{th}$ entry of the corresponding memory device 200) and a random leak rate $Lk_{PRNG}$. After each synaptic weight $W_{ij}$ has been read from the $i^{th}$ entry of the memory array 160, the first adder 175 increments the modified membrane potential variable V' by the value selected by the second multiplexer 172.

The second adder 178 increments the threshold parameter Th (loaded from the $i^{th}$ entry of the corresponding memory device 200) by a random threshold $Th_{PRNG}$. In another embodiment, the unit 178 is a multiplexer. The comparator 179 generates a firing event if the comparator 179 determines that the updated membrane potential variable V has exceeded the value provided by the second adder 178. The membrane potential variable V is reset to $V_{reset}$ after the firing event is generated.

When the processor 150 has finished iterating through each index of the axon vector 255, the updated neuron attributes 215 (e.g., the updated membrane potential variable V) are written to the memory device 200. An update vector 257 representing the firing activity of neurons 11 in said time step is generated and sent to the scheduler 350.

Figure 9:
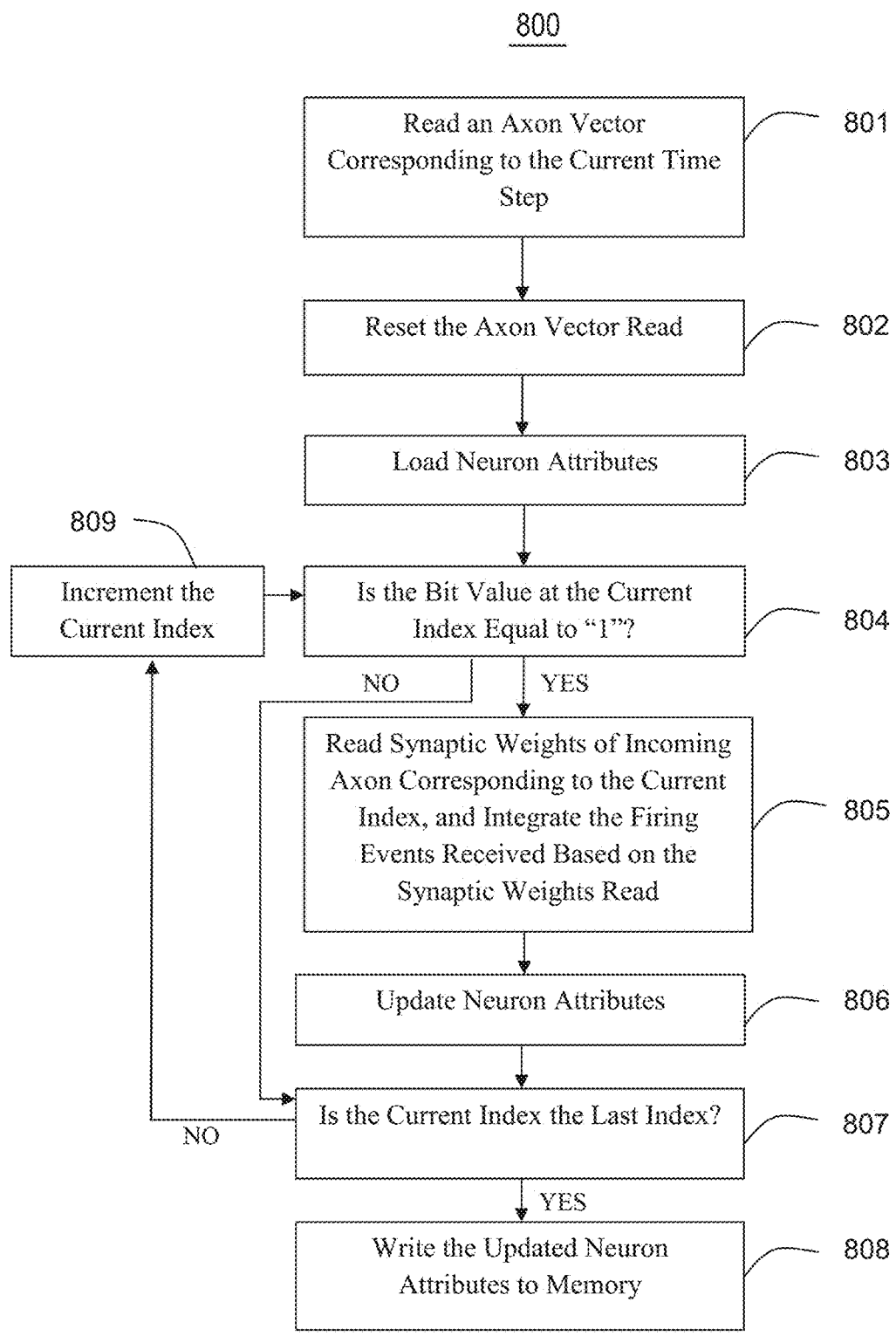
FIG. 9 illustrates a flowchart of an example process for processing incoming firing events in a time-division multiplexed manner, in accordance with an embodiment of the invention.

FIG. 9 illustrates a flowchart of an example process 800 for processing incoming firing events in a time-division multiplexed manner, in accordance with an embodiment of the invention. In process block 801, read an axon vector corresponding to the current time step. In process block 802, reset the axon vector read. In process block 803, load neuron attributes. In process block 804, determine if the bit value at the current index of the axon vector is "1". If the bit value is 1, proceed to process block 805. If the bit value is not "1", proceed to process block 807.

In process block 805, read synaptic weights of the incoming axon corresponding to the current index, and integrate the firing events received based on the synaptic weights read. In process block 806, update neuron attributes. In process block 807, determined whether the current index is the last index of the axon vector. If the current index is the last index, proceed to process block 808. If the current index is not the last index, proceed to process block 809. In process block 808, write the updated neuron attributes to memory. In process block 809, increment the current index. Process blocks 803-809 are repeated for each neuron.

Figure 10:
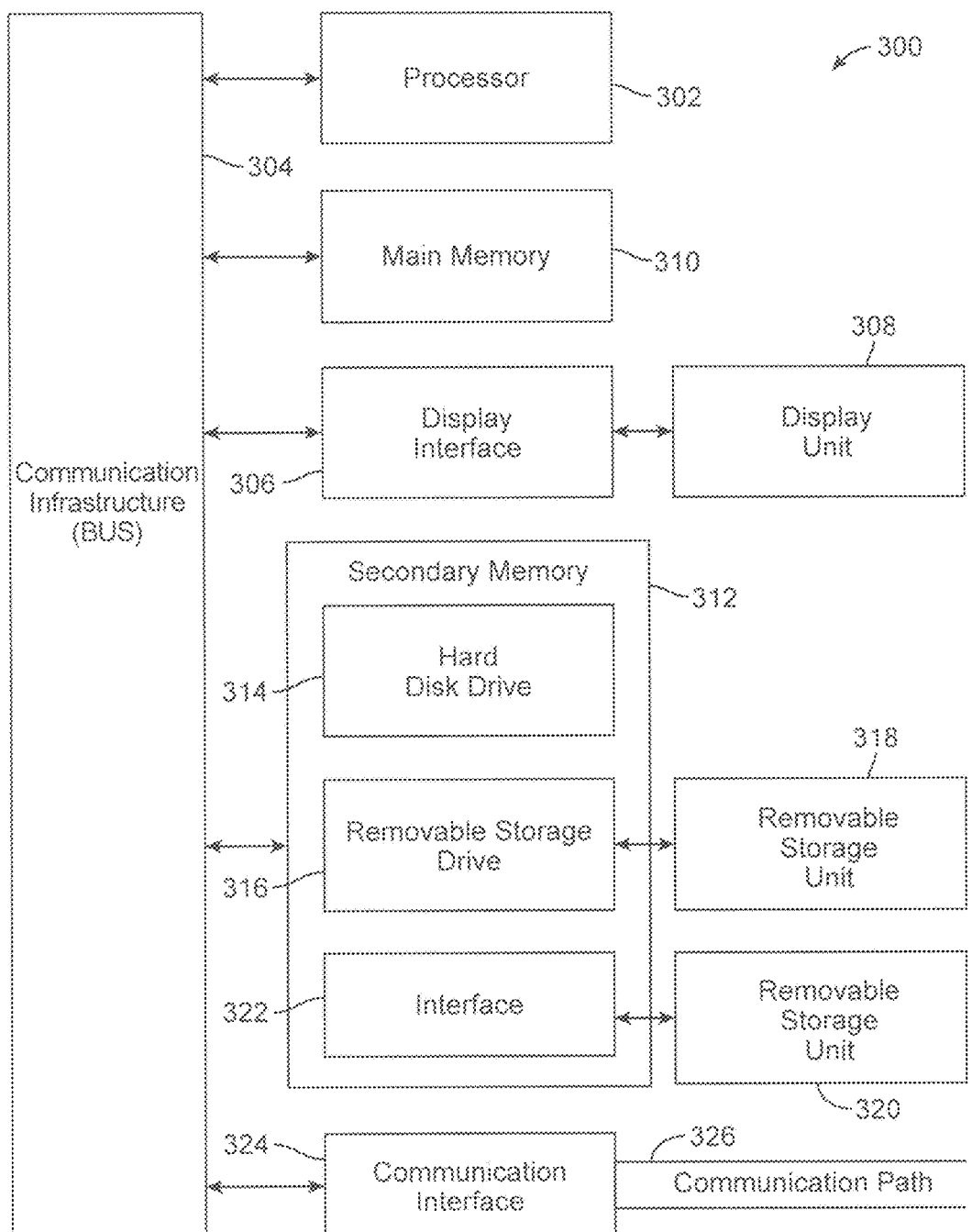
FIG. 10 is a high level block diagram showing an information processing system useful for implementing one embodiment of the invention.

FIG. 10 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
multiplexing computation and control logic for multiple neurons utilizing a processor including a memory array and a computation logic circuit, wherein the multiplexing comprises:
  maintaining, in the memory array, synaptic connectivity information for the multiple neurons, wherein the memory array comprises multiple entries, and each entry of the memory array maintains a synaptic weight for a corresponding neuron of the multiple neurons; and
  integrating, via the computation logic circuit, one or more firing events targeting the multiple neurons, wherein the computation logic circuit is time-multiplexed based on a number of neurons included in the multiple neurons, and the integrating comprises:
    at a first time step of multiple time steps:
      accessing a collection of axon vectors, wherein each axon vector of the collection corresponds to a time step of the multiple time steps, the axon vector comprises multiple bits, each bit of the axon vector corresponds to an axon of multiple axons connected to the multiple neurons, and the bit indicates whether a firing event is scheduled for delivery to the corresponding axon in the corresponding time step;
      reading a first axon vector from the collection that corresponds to the first time step; and
      for a first bit of the first axon vector that indicates a first firing event is scheduled for delivery to a corresponding first axon of the multiple axons in the first time step:
        reading a first synaptic weight for a first neuron of the multiple neurons that is connected to the corresponding first axon from a first entry of the memory array that corresponds to the first neuron;
        generating first neuronal firing activity based on the first synaptic weight, wherein the first neuronal firing activity comprises a second firing event targeting a second axon of the multiple axons in a second time step of the multiple time steps, and the second time step occurs after the first time step;
        writing an updated synaptic weight for the first neuron to the first entry of the memory array, wherein the updated synaptic weight is based on at least one of a learning rule and the first neuronal firing activity; and
        updating a second axon vector from the collection that corresponds to the second time step to include information identifying the second firing event for delivery to the second axon in the second time step.

2. The method of claim 1, wherein the multiplexing further comprises:
dividing each time step into multiple time slots, wherein a number of time slots included in the multiple time slots is equal to the number of neurons, each time slot corresponds to a neuron of the multiple neurons, and the number of neurons is based in part on performance of the memory array.

3. The method of claim 1, wherein the multiplexing integrating further comprises:
at the first time step:
  delivering, via the computation logic circuit, the first firing event to the first axon based on the first axon vector.

4. The method of claim 3, wherein the integrating further comprises:
at the first time step:
  integrating the first firing event into a membrane potential variable of the first neuron based on the first synaptic weight.

5. The method of claim 4, wherein the integrating further comprises:
at the first time step:
  the first neuronal firing activity in response to the membrane potential variable of the first neuron exceeding a threshold parameter of the first neuron;
  generating an update vector comprising multiple bits, wherein each bit of the update vector corresponds to a neuron of the multiple neurons and indicates whether the computation logic circuit generated neuronal firing activity for the corresponding neuron during the time step, and one or more axon vectors from the collection are updated based on the update vector; and
  controlling transposable access to the memory array for enhanced learning operation, wherein one or more synaptic weights are readable from and writable to one or more entries of the memory array in both horizontal and vertical directions.

6. A system comprising a computer processor, a computer-readable hardware storage medium, and program code embodied with the computer-readable hardware storage medium for execution by the computer processor to implement a method comprising:
multiplexing computation and control logic for multiple neurons utilizing a processor including a memory array and a computation logic circuit, wherein the multiplexing comprises:
  maintaining, in the memory array, synaptic connectivity information for the multiple neurons, wherein the memory array comprises multiple entries, and each entry of the memory array maintains a synaptic weight for a corresponding neuron of the multiple neurons; and
  integrating, via the computation logic circuit, one or more firing events targeting the multiple neurons, wherein the computation logic circuit is time-multiplexed based on a number of neurons included in the multiple neurons, and the integrating comprises:
    at a first time step of multiple time steps:
      accessing a collection of axon vectors, wherein each axon vector of the collection corresponds to a time step of the multiple time steps, the axon vector comprises multiple bits, each bit of the axon vector corresponds to an axon of multiple axons connected to the multiple neurons, and the bit indicates whether a firing event is scheduled for delivery to the corresponding axon in the corresponding time step;
      reading a first axon vector from the collection that corresponds to the first time step; and
      for a first bit of the first axon vector that indicates a first firing event is scheduled for delivery to a corresponding first axon of the multiple axons in the first time step:

reading a first synaptic weight for a first neuron of the multiple neurons that is connected to the corresponding first axon from a first entry of the memory array that corresponds to the first neuron;

generating first neuronal firing activity based on the first synaptic weight, wherein the first neuronal firing activity comprises a second firing event targeting a second axon of the multiple axons in a second time step of the multiple time steps, and the second time step occurs after the first time step;

writing an updated synaptic weight for the first neuron to the first entry of the memory array, wherein the updated synaptic weight is based on at least one of a learning rule and the first neuronal firing activity; and updating a second axon vector from the collection that corresponds to the second time step to include information identifying the second firing event for delivery to the second axon in the second time step.

7. The system of claim 6, wherein the multiplexing further comprises:

dividing each time step into multiple time slots, wherein a number of time slots included in the multiple time slots is equal to the number of neurons, each time slot corresponds to a neuron of the multiple neurons, and the number of neurons is based in part on performance of the memory array.

8. The system of claim 6, wherein the integrating further comprises:

at the first time step:
delivering, via the computation logic circuit, the first firing event to the first axon based on the first axon vector.

9. The system of claim 8, wherein the integrating further comprises:

at the first time step:
integrating the first firing event into a membrane potential variable of the first neuron based on the first synaptic weight.

10. The system of claim 9, wherein the integrating further comprises:

at the first time step:
the first neuronal firing activity in response to the membrane potential variable of the first neuron exceeding a threshold parameter of the first neuron;
generating an update vector comprising multiple bits, wherein each bit of the update vector corresponds to a neuron of the multiple neurons and indicates whether the computation logic circuit generated neuronal firing activity for the corresponding neuron during the time step, and one or more axon vectors from the collection are updated based on the update vector; and
controlling transposable access to the memory array for enhanced learning operation, wherein one or more synaptic weights are readable from and writable to one or more entries of the memory array in both horizontal and vertical directions.

11. A computer program product comprising a computer-readable hardware storage medium having program code embodied therewith, the program code being executable by a computer to implement a method comprising:

multiplexing computation and control logic for multiple neurons utilizing a processor including a memory array and a computation logic circuit, wherein the multiplexing comprises:

maintaining, in the memory array, synaptic connectivity information for the multiple neurons, wherein the memory array comprises multiple entries, and each entry of the memory array maintains a synaptic weight for a corresponding neuron of the multiple neurons; and integrating, via the computation logic circuit, one or more firing events targeting the multiple neurons, wherein the computation logic circuit is time-multiplexed based on a number of neurons included in the multiple neurons, and the integrating comprises:

at a first time step of multiple time steps:
accessing a collection of axon vectors, wherein each axon vector of the collection corresponds to a time step of the multiple time steps, the axon vector comprises multiple bits, each bit of the axon vector corresponds to an axon of multiple axons connected to the multiple neurons, and the bit indicates whether a firing event is scheduled for delivery to the corresponding axon in the corresponding time step;
reading a first axon vector from the collection that corresponds to the first time step; and
for a first bit of the first axon vector that indicates a first firing event is scheduled for delivery to a corresponding first axon of the multiple axons in the first time step:
reading a first synaptic weight for a first neuron of the multiple neurons that is connected to the corresponding first axon from a first entry of the memory array that corresponds to the first neuron;
generating first neuronal firing activity based on the first synaptic weight, wherein the first neuronal firing activity comprises a second firing event targeting a second axon of the multiple axons in a second time step of the multiple time steps, and the second time step occurs after the first time step;
writing an updated synaptic weight for the first neuron to the first entry of the memory array, wherein the updated synaptic weight is based on at least one of a learning rule and the first neuronal firing activity; and
updating a second axon vector from the collection that corresponds to the second time step to include information identifying the second firing event for delivery to the second axon in the second time step.

12. The computer program product of claim 11, wherein the multiplexing further comprises:

dividing each time step into multiple time slots, wherein a number of time slots included in the multiple time slots is equal to the number of neurons, each time slot corresponds to a neuron of the multiple neurons, and the number of neurons is based in part on performance of the memory array.

13. The computer program product of claim 11, wherein the integrating further comprises:

at the first time step:
delivering, via the computation logic circuit, the first firing event to the first axon based on the first axon vector.

14. The computer program product of claim 13, wherein the integrating further comprises:
at the first time step:
integrating the first firing event into a membrane potential variable of the first neuron based on the first synaptic weight.

15. The computer program product of claim 14, wherein the integrating further comprises:
at the first time step:
the first neuronal firing activity in response to the membrane potential variable of the first neuron exceeding a threshold parameter of the first neuron;
generating an update vector comprising multiple bits, wherein each bit of the update vector corresponds to a neuron of the multiple neurons and indicates whether the computation logic circuit generated neuronal firing activity for the corresponding neuron during the time step, and one or more axon vectors from the collection are updated based on the update vector; and
controlling transposable access to the memory array for enhanced learning operation, wherein one or more synaptic weights are readable from and writable to one or more entries of the memory array in both horizontal and vertical directions.

\* \* \* \* \*